United States Patent
Roszelle

[15] 3,688,844
[45] Sept. 5, 1972

[54] OIL RECOVERY PROCESS USING MICELLAR DISPERSIONS CONTAINING A METAL PHOSPHATE

[72] Inventor: Wayne O. Roszelle, 6204 S. Prescott, Littleton, Colo. 80120

[22] Filed: March 29, 1971

[21] Appl. No.: 129,213

[52] U.S. Cl. .................................. 166/274, 166/273
[51] Int. Cl. ........................................... E21b 43/22
[58] Field of Search ............... 166/273–275, 305 R; 252/8.55 D

[56] References Cited

UNITED STATES PATENTS

| | | |
|---|---|---|
| 3,021,901 | 2/1962 | Earlougher ............ 166/275 X |
| 3,191,676 | 6/1965 | Froning .................... 166/275 |
| 3,203,480 | 8/1965 | Froning ................ 166/274 X |
| 3,254,714 | 6/1966 | Gogarty et al. ............ 166/274 |
| 3,258,071 | 6/1966 | Yu Shen et al. ........... 166/275 |
| 3,506,070 | 4/1970 | Jones ......................... 166/273 |

*Primary Examiner*—Stephen J. Novosad
*Attorney*—Joseph C. Herring, Richard C. Willson, Jr. and Jack L. Hummel

[57] ABSTRACT

Improved oil recoveries are obtained in an oil-bearing subterranean reservoir having an interstitial water with a relatively high hardness by flooding the reservoir with a micellar dispersion which contains about 1 percent metal phosphate.

12 Claims, No Drawings

OIL RECOVERY PROCESS USING MICELLAR DISPERSIONS CONTAINING A METAL PHOSPHATE

BACKGROUND OF THE INVENTION

1. Field Of The Invention

This invention relates to the secondary and tertiary recovery of oil from subterranean formations; particularly, recovery utilizing micellar dispersion flooding.

2. Description Of The Prior Art

Secondary and tertiary recovery of oil via micellar dispersion flooding is not a new concept. U.S. Pat. No. 3,254,714 to Gogarty et al. teaches the use of a microemulsion containing up to about 43 percent water in the recovery of crude oil.

U.S. Pat. No. 3,497,006 to Jones et al. discloses a secondary recovery process which utilizes an oil-external micellar dispersion containing up to about 90 percent water. Only about 1–20 percent formation pore volume is required in this process.

U.S. Pat. No. 3,506,070 to Jones discloses a water-external micellar dispersion comprised of water, hydrocarbon and surfactant in the secondary recovery of crude oil.

These, and other similar processes, have proven to be quite advantageous. However, they are of limited value when used in formations which have an interstitial water with a relatively high hardness. The divalent cations in this water react with the surfactants in the micellar dispersion, destroying its effectiveness.

SUMMARY OF THE INVENTION

Applicant has discovered that incorporating a small amount of a metal phosphate into a micellar dispersion overcomes the aforementioned disadvantages encountered in flooding a reservoir having an interstitial water of relatively high hardness. The metal phosphates soften the connate water by tying up the divalent cations, thereby effectively isolating them from the micellar dispersion.

DESCRIPTION OF THE INVENTION

The term "micellar dispersion" as used herein is meant to include micellar solutions, "micro-emulsions" [Schulman and Montagne, "Annals of the New York Academy of Sciences," 92, pages 366–371 (1961)], "transparent" emulsions (Blair, Jr., et al., U.S. Pat. No. 2,356,205) and micellar dispersion technology taught by C. G. Sumner, Clayton's, The Theory of Emulsions and Their Technical Treatment, 5th edition, pp. 315–320 (1954).

The micellar dispersions are composed essentially of hydrocarbon, aqueous medium (e.g., water, brackish water and brine water), surfactant, and optionally cosurfactant and/or electrolyte. Examples of volume amounts include about 2 percent to about 90 percent hydrocarbon, about 5 percent to about 95 percent aqueous medium, at least about 4 percent surfactant, about 0.01 percent to about 20 percent of cosurfactant and about 0.001 percent to about 5 percent by weight of electrolyte. In addition, the micellar dispersion and/or subsequent slugs can contain corrosion inhibiting agents, bactericides, etc. Examples of useful hydrocarbon, surfactant, aqueous medium, cosurfactant, and electrolyte include those found in U.S. Pat. Nos. 3,254,714, 3,497,006, and 3,506,070.

Interstitial or connate water hardness as used herein is defined as the amount of dissolved salts of calcium and magnesium in the water. The degree of hardness is expressed in terms of "equivalent parts per million of calcium carbonate." It is considered economical to incorporate the metal phosphates of this invention within a micellar dispersion to flood a reservoir wherein the interstitial water hardness is greater than about 1,000 ppm equivalent calcium carbonate.

The metal phosphates are incorporated within the micellar dispersion to inhibit the adverse effects of the interstitial water hardness on the micellar dispersion. The hardness is reduced as a result of the phosphate ions sequestering the calcium and magnesium ions into a form which does not permit their adverse influence on the dispersion.

The most preferable metal phosphate useful with this invention is sodium hexametaphosphate. Other useful phosphates include trisodium phosphate, sodium metaphosphate, sodium tetraphosphate, potassium hexametaphosphate, and like phosphates. In general, any water soluble phosphate which is compatible with the micellar dispersion and which will sequester divalent cations is useful with this invention.

The concentration of metal phosphates should preferably be about 0.01 percent to about 5 percent, more preferably about 0.1 percent to about 3 percent, and most preferably from about 0.7 percent to about 1.2 percent of the total weight percent of the micellar dispersion. If present in less than about 0.01 weight percent, the contribution of the phosphate is insignificant; on the other hand, if present in amounts greater than about 5 weight percent, it adversely affects the micellar dispersion.

A mobility buffer may be injected following the micellar dispersion to obtain improved flooding characteristics, e.g., inhibits fingering of a subsequently injected drive water into the micellar dispersion and/or crude oil. From about 5 percent to about 75 percent formation pore volume is useful, depending upon the particular reservoir characteristics. Preferably, the mobility of the mobility buffer is about equal to or less than that of the micellar dispersion.

After the mobility buffer is injected into the subterranean formation, sufficient drive medium, e.g., drive water, is injected to move or displace the micellar dispersion and optionally mobility buffer toward a production well in fluid communication with the subterranean reservoir to recover crude oil through the production well.

EXAMPLE I

Two Berea sandstone cores 4 feet long by 3 inches in diameter, having characteristics indicated in Table 1, are saturated with crude oil and waterflooded to residual saturation with water containing approximately 100,000 ppm of total dissolved solids, of which 10,000 ppm is equivalent to calcium carbonate hardness. Sample A is then flooded with about 2 percent pore volume of an oil-external micellar dispersion composed of 13.6 weight percent petroleum sulfonate (440 equivalent weight), 25.7 weight percent crude oil, 59.2 weight percent of a 5,000 ppm aqueous sodium chloride solution, and 1.6 percent primary amyl alcohol.

Sample B is treated in precisely the same manner; however, one weight percent sodium hexametaphosphate is incorporated into the micellar dispersion. The micellar dispersions of each sample are displaced with approximately one pore volume of fresh water containing 1,200 ppm of No. 530 Pusher polymer (partially hydrolyzed high molecular weight polyacrylamide sold by Dow Chemical Co.) The results are indicated in Table 1.

TABLE 1

| Sample | Effective Porosity (%) | Core Characteristics Permeability (md) | Residual Oil Saturation (%) | %Recovery of Crude Oil in Core |
| --- | --- | --- | --- | --- |
| A | 20.7 | 603 | 37.4 | 61.6 |
| B | 20.4 | 572 | 36.2 | 79.7 |

EXAMPLE II

The procedure of Example I is repeated except the micellar dispersion is composed of 12.8 weight percent petroleum sulfonate (440 equivalent weight), 26.4 weight percent crude oil, 59.2 weight percent of a 5,000 ppm aqueous sodium chloride solution, and 1.6 percent primary amyl alcohol. Sample C contains no metal phosphate, while Example D contains one percent sodium hexametaphosphate. The core characteristics and the percent crude oil recovery results are compared in Table 2.

TABLE 2

| Sample | Effective Porosity (%) | Core Characteristics Permeability (md) | Residual Oil Saturation (%) | % Recovery of Crude Oil in Core |
| --- | --- | --- | --- | --- |
| C | 21.4 | 663 | 37.7 | 56.7 |
| D | 19.6 | 753 | 31.4 | 68.9 |

EXAMPLE III

The procedure of Example I is repeated with a micellar dispersion composed of 11.5 weight percent petroleum sulfonate (440 equivalent weight), 1.5 weight percent petroleum sulfonate (460 equivalent weight), 26.1 weight percent crude oil, 59.6 weight percent of a 5,000 ppm aqueous sodium chloride solution, and 1.3 weight percent primary amyl alcohol. Sample E contains no metal phosphate, while Sample F contains one percent sodium hexametaphosphate. The core characteristics and the percent crude oil recovery results are compared in Table 3.

TABLE 3

| Sample | Effective Porosity (%) | Core Characteristics Permeability (md) | Residual Oil Saturation (%) | % Recovery of Crude Oil in Core |
| --- | --- | --- | --- | --- |
| E | 21.2 | 878 | 31.4 | 56.7 |
| F | 19.7 | 739 | 33.9 | 70.2 |

The results of these examples indicate, for various micellar dispersion compositions, an average increase in crude oil recovery of about 14.6 percent when sodium hexametaphosphate is present in amounts of only about one percent.

It should be understood that the invention is capable of a variety of modifications and variations which will be made apparent to those skilled in the art by a reading of the specification and which are to be included within the spirit of the claims appended hereto.

What is claimed is:

1. In a process for recovering crude oil from an oil-bearing subterranean formation having an interstitial water hardness of at least about 500 ppm equivalent calcium carbonate and wherein a micellar dispersion comprised of hydrocarbon, surfactant and aqueous medium is injected into the reservoir through an injection means and displaced through the reservoir toward a production means to recover crude oil, the improvement comprising incorporating into the micellar dispersion about 0.01 to about 5 weight percent of an alkali metal phosphate.

2. The process of claim 1 wherein the micellar dispersion is comprised of about 2 percent to about 90 percent hydrocarbon, about 5 percent to about 95 percent aqueous medium, and at least about 4% surfactant.

3. The process of claim 2 wherein the micellar dispersion optionally contains about 0.01 percent to about 20 percent cosurfactant and/or 0.001 percent to about 5 percent by weight of electrolyte.

4. The process of claim 1 wherein about 0.1 percent to about 3 percent by weight of the alkali metal phosphate is incorporated into the micellar dispersion.

5. The process of claim 1 wherein the interstitial water hardness is at least about 1,000 ppm equivalent calcium carbonate.

6. The process of claim 1 wherein an aqueous mobility buffer is injected behind the micellar dispersion.

7. The process of claim 1 wherein the alkali metal phosphate is sodium hexametaphosphate.

8. The process of claim 1 wherein the micellar dispersion is oil-external.

9. The process of claim 1 wherein the micellar dispersion is water-external.

10. The process of claim 1 wherein the interstitial water hardness is at least about 5,000 ppm equivalent calcium carbonate.

11. The process of claim 1 wherein about 1 percent to about 20 percent formation pore volume of the micellar dispersion is injected into the formation.

12. In a process for recovering crude oil from an oil-bearing subterranean formation having an interstitial water hardness of at least about 1,000 ppm equivalent calcium carbonate and wherein a micellar dispersion comprised of hydrocarbon, surfactant and aqueous medium is injected through an injection means into the reservoir to displace crude oil toward a production means in fluid communication with the subterranean reservoir and wherein crude oil is recovered through the production means, the improvement comprising incorporating into the micellar dispersion about 0.01 to about 5 weight percent of sodium hexametaphosphate.

* * * * *